May 24, 1955
G. BRIGGS
2,709,239
PHASE-SHIFTING NETWORK
Filed June 12, 1952
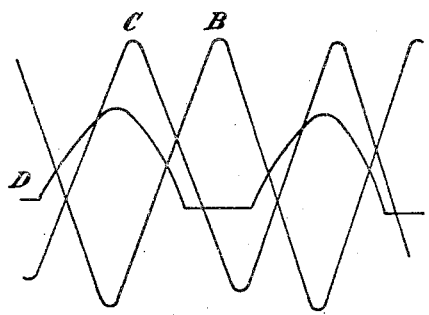
George Briggs
INVENTOR
By Richardson, David and Norden
his ATTYS.

United States Patent Office 2,709,239
Patented May 24, 1955

2,709,239

PHASE-SHIFTING NETWORK

George Briggs, London, England, assignor to B. V. C. Electronic Developments Limited, London, England, a British company Application June 12, 1952, Serial No. 293,083

13 Claims. (Cl. 323—119)

This invention relates to phase shifting arrangements for shifting the phase of an alternating current flowing in a first circuit relative to the phase of an alternating current flowing in a second circuit without altering the relative magnitudes of the voltages in the two circuits, and has for its chief object to provide simple and novel arrangements for securing this end.

In the phase shifting arrangements for shifting the phase of an alternating current flowing in a first circuit relative to the phase of an alternating current flowing in a second circuit, according to the present invention, the first circuit is connected to an A. C. source, and the second circuit is connected in, or to, the common limb of two circuits connected in push-pull across an A. C. supply, one of said circuits including a condenser to advance the phase of the current flowing therein and the other of said circuits including a Thyratron type valve, means being provided for varying the potential applied to the grid of said Thyratron type valve relative to the anode voltage thereon in order to control the point on the anode voltage cycle at which the valve commences to fire so as to vary the phase of the current flowing in the second of said push-pull circuits, thereby causing a relative variation in the phases of the currents flowing in the first and second circuits without thereby substantially varying their relative magnitudes.

In order that this invention may be the more clearly understood and readily carried into effect, reference may be made to the accompanying drawings in which:

Figure 1 is the circuit diagram of one form of phase shifting arrangement according to the present invention as applied to the control of a separately excited wound-armature motor, and Figure 2 is the circuit diagram of a modified form of such a phase shifting arrangement.

Figure 3 illustrates the application of the present invention to the control of a two-phase motor.

Figure 4 is a reproduction of certain waveform curves obtained with a cathode ray oscilloscope.

Referring now more particularly to Figure 1 of the accompanying drawings which, as stated above, illustrates one convenient embodiment of the present invention as applied to the control of a separately excited wound-armature A. C. motor, the phase shifting network comprises a transformer 10, the primary 11 of which is connected to a suitable A. C. supply 12. The secondary winding 13 of the transformer 10 is center-tapped at 14 and the right hand end 16 of secondary winding 13 is connected to the anode of a Thyratron 18. The cathode 19 of Thyratron 18 is connected back to the center tap 14 of secondary winding 13 through the primary winding 20 of a transformer 24. The secondary winding 25 of transformer 24 is shown shunted by a capacitor 26. The cathode 19 of Thyratron 18 is also connected through a further capacitor 22 to the left hand end 27 of transformer secondary winding 13.

The field winding 28 of a separately excited wound-armature A. C. motor 29 is shown energized from the secondary winding 25 of transformer 24. The transformer 24 excludes from the motor field winding 28, the D. C. component from Thyratron 18 which would otherwise be present if the field winding 28 were connected directly in the phase shifting circuit in the position presently occupied by the primary winding 20 of transformer 24.

The armature winding 30 of motor 29 is connected to an A. C. source 32 through a transformer 33. The circuit of armature winding 30 may be considered to be the "first circuit" referred to above and the circuit of field winding 28 may be considered to be the "second circuit."

Means are provided for varying the potential applied to the grid of Thyratron type valve relative to the anode voltage thereon. These means are illustratively shown as comprising a source of potential shown as a battery 34 adjustably connected through a potentiometer 35 to the control grid 36 of Thyratron 18, the circuit being completed through a pair of terminals 37 adapted to be connected to a suitable source of control potential for controlling the speed and direction of rotation of the motor 29. Where the phase shifting network of the present invention is used in connection with a servo-mechanism, the control potential applied to terminals 37 may be the usual error signal of such mechanism. In such instances, a magnetic amplifier 38 may advantageously be included in the circuit of armature 30 to reduce the standby armature current when the error signal is zero and thus avoid overheating of the motor and inefficiency of the system. The control input of the magnetic amplifier 38 is shown connected to terminals 40 to which an error signal may be applied concurrently with the error signal applied to terminals 37.

In the modification of the present invention illustrated in Figure 2, which is also intended to control a separately excited wound-armature motor, the voltage altering network provided by the centre-tapped transformer 10 of Figure 1 is dispensed with and in its place a voltage altering network comprising a tapped resistance 41 is connected across the A. C. supply. One end 42 of the said resistance is connected to the anode 17 of the Thyratron type valve 18, the circuit of which is completed by connecting the cathode 19 to one end of a potentiometer 43 the adjustable tap 44 of which is connected back to the tap 45 of resistor 41 through the primary 20 of a transformer 24 similar to that described in connection with Figure 1. The secondary 25 of the transformer feeds the field winding 28 of the motor, which field winding again constitutes the "second" circuit. The second of the two push-pull circuits is completed by connecting the other end 46 of the resistance 41 through a condenser 47 to the other end of the potentiometer 43. Condensers 48 and 49 are shunted across the tapped resistance 41, the condenser 49 across the Thyratron half preferably being greater than the condenser 48 across the condenser half. The other connections are completed in the manner described in connection with Figure 1 and like reference numerals have been used to indicate corresponding parts.

The modified form of the present invention shown in Figure 3 is intended to control a two-phase motor 50. One phase winding 51 is connected in circuit in a like manner to the field winding 28 in the arrangement described in connection with Figures 1 and 2, and the other phase winding 52 is connected in a similar manner to the wound armature 30. The winding 51 is in this case the "second" circuit and the winding 52 is the "first" circuit.

Now it will be appreciated that by varying the potential applied to the grid of the Thyratron type valve in the form of a D. C. potential; an A. C. potential; or by means of pulses, relative to the phase of the voltage applied to the anode of the Thyratron type valve, conditions can be established whereby, other things being equal, the valve can be arranged to fire at any predetermined point on the anode voltage cycle.

We are unable to explain at present, just why we obtain the remarkable results that we do with the phase shifting networks according to the present invention, but it will be found that by varying the voltage on the grid of the Thyratron type valve 18, conditions such as those described more fully in British Patents Nos. 643,036 (published September 15, 1951) and 663,030 (published December 12, 1951) can be obtained, and the motor can be adjusted to run in one direction or the other at any speed within its range, and display a very considerable holding torque at the neutral position when the two currents are in phase. The tentative explanation of this achievement advanced in our said British patents, will obviously not apply to the phase shifting networks according to the present invention. It is, however, clear that in some way or the other the condenser 22 in all of the phase shifting networks functions to restore the lacking half-wave or to overcome the asymmetry which one would expect to appear in the common limb of the two push-pull circuits due to the firing of the Thyratron 18. This will be clear from Figure 4 which, as stated above, is a reproduction of photographs taken of the screen of a cathode ray oscilloscope under different working conditions with the phase shifting network in Figure 1. In Figure 4 the curve B shows the wave-form of the current in the limb including the primary 20 of the transformer 24, when the Thyratron is not firing, and the curve D shows the wave-form of the current when that half of the circuit including the condenser 22 is broken and the Thyratron is fully firing; and the curve C shows the wave-form of the current when the Thyratron is fully firing and the condenser 22 is in circuit. It will be seen that these curves are for all practical purposes the same as those obtained with the phase shifting network of our said British Patents Nos. 643,036 and 663,030. Once again the noticeable feature is the sinusoidal nature of the curve C which one would expect to be of anything but a sinusoidal nature, including as it does the output from a Thyratron valve.

With these phase shifting networks, therefore, all we have to do to provide the desired variation in the phase of the A. C. current flowing in the second circuit relative to that flowing in the first circuit is appropriately to vary the voltage applied to the grid 36 of the Thyratron type valve 18. According to the particular circumstances in which the phase shifting network is being used, the voltage applied to the grid of the Thyratron 15 may be D. C., in which case the control is obtained by variation of the voltage applied to the grid; pulsating, in which case the magnitude and/or the phase of the voltage applied to the grid may be varied; or it may be alternating, in which case again the control may be obtained by varying the magnitude of the voltage applied to the grid and/or the phase of the grid voltage relative to the anode voltage. As the magnitude of the variable phase does not vary substantially, it will be seen that the motor is brought to standstill, not by reducing the voltage of the variable phase to zero, but by an interlock of the phases which automatically applies a breaking torque. Where the voltage of the variable phase is reduced to zero the motor tends to hunt in the absence of complicated anti-hunt networks, but with the present invention no such anti-hunt networks are required as a very considerable stiffness of control is provided.

Again, although the present invention has been more particularly described in its application to the control of a motor, it is by no means limited thereto, but is of general application to all networks in which it is desired to shift the phase of an A. C. current flowing in a first circuit relative to the phase of an A. C. current flowing in a second circuit, without substantially altering its magnitude, whatever be the purpose for which the said two currents are used.

I claim:

1. A phase shifting network for shifting the phase of an alternating current flowing in a first circuit relative to the phase of an alternating current flowing in a second circuit, said network comprising: a source of alternating current for energizing the first circuit; a voltage altering network energizable by said source simultaneously with said first circuit, said second circuit being connected to said voltage altering network, said voltage altering network permitting energization of said second circuit therefrom at a potential different from the potential of said source; a capacitatively reactive circuit element connected in one of said circuits for introducing a shift in the phase of current flowing therein; a discharge device included in the other of said circuits, said discharge device being substantially non-conductive in response to an increasing potential until a predetermined minimum firing potential has been applied thereto and substantially fully conductive thereafter, said other circuit being connected for energization from said source simultaneously with said voltage altering network; and means for varying said firing potential, whereby the phase relationship between said first and second circuits may be varied without substantially altering their respective magnitudes.

2. A phase shifting network according to claim 1, in which said voltage altering network comprises a transformer.

3. A phase shifting network according to claim 2, in which said transformer comprises a center tapped winding, said one of said two circuits being connected to said winding center tap and said other circuit including said discharge device being connected for energization by the full voltage of said winding in series with said reactive circuit element, said reactive circuit element being common to both of said circuits.

4. A phase shifting network according to claim 1, further comprising means responsive to a control potential for controlling the flow of current in one of said circuits, and in which said control potential is applied to said means for varying said firing potential for controlling said variation thereof.

5. A phase shifting network for shifting the phase of an alternating current flowing in a first circuit with respect to the phase of an alternating current flowing in a second circuit, said network comprising: a source of alternating current; a voltage dividing network energized by said source, said first and second circuits being energized at different potentials from said voltage dividing network; a common capacitatively reactive circuit element included in both of said circuits for introducing a phase shift in the current flowing therein; a discharge device serially included in the other of said circuits, said discharge device being substantially non-conductive in response to an increasing potential until a predetermined minimum firing potential has been applied thereto and substantially fully conductive thereafter; and means for varying said firing potential, whereby the phase relationship between said first and second circuits may be varied without substantially altering their respective magnitudes.

6. A phase shifting network according to claim 5, in which said reactive circuit element is a capacitor.

7. A phase shifting network according to claim 5, in which said voltage dividing network consists of a center tapped impedance, said one circuit being connected to said center tap and one end of said impedance and said other circuit being connected across said impedance.

8. A phase shifting network according to claim 7, in which said impedance is a transformer winding.

9. A phase shifting network according to claim 7, in which said impedance consists of two serially connected resistors.

10. A control system for an alternating current motor, said motor comprising two separately energizable windings, the direction and speed of rotation of said motor being determined by a phase displacement of current flowing in one of said windings relative to the current flowing in the other of said windings without substantially varying their respective magnitudes, said control system comprising: a source of alternating current; a voltage dividing network connected to said source; a first energizing circuit for one of said motor windings connected to said voltage dividing network for energizing one of said motor windings at a reduced potential; a capacitatively reactive circuit element serially included in said first energizing circuit for displacing the phase of the current flowing therein; a second energizing circuit for the other of said motor windings connected between a full voltage terminal of said dividing network and the junction between said reactive circuit element and said motor winding in said first circuit; a discharge device serially included in said second energizing circuit in a portion thereof not common to said first circuit, said discharge device being substantially non-conductive in response to an increasing potential until a minimum predetermined firing potential has been applied thereto and substantially fully conductive thereafter, and means for varying said firing potential.

11. A control system according to claim 10, further comprising means included in said second energizing circuit for excluding from said motor winding any direct current component of current flowing through said discharge device.

12. A phase shifting network for shifting the phase of an alternating current flowing in a second circuit relative to the phase of an alternating current flowing in a first circuit, comprising: a source of alternating current for energizing the first circuit; a voltage altering network energizable by said source simultaneously with said first circuit; a capacitor and a discharge device connected in series across said voltage altering network, said discharge device being substantially non-conductive in response to an increasing potential until a predetermined minimum firing potential has been applied thereto and substantially fully conductive thereafter; an impedance; a connection through said impedance between a point in the circuit between said capacitor and discharge device to a point in the voltage altering network, and means for varying the firing potential of said discharge device, whereby the phase of the alternating current flowing in said impedance may be varied relative to the phase of the current flowing in the first circuit without substantially varying their relative magnitudes.

13. A phase shifting network for shifting the phase of an alternating current flowing in a second circuit relative to the phase of an alternating current flowing in a first circuit, comprising: a source of alternating current for energizing the first circuit; a transformer having a primary winding energized by said source simultaneously with said first circuit and a center-tapped secondary winding; a capacitor and a discharge device connected in series across said secondary winding, said discharge device being substantially non-conductive in response to an increasing potential until a predetermined minimum firing potential has been applied thereto and substantially fully conductive thereafter; a second transformer having a primary winding and a secondary winding, said primary winding being connected between said center tap on the secondary winding of the first transformer and an intermediate point in the series connection between said capacitor and said discharge device, and means for varying the firing potential applied to said discharge device, whereby the phase of the current flowing in the secondary winding of the second transformer may be varied relative to the phase of the current flowing in the first circuit without substantially varying their relative magnitudes.

References Cited in the file of this patent

UNITED STATES PATENTS 2,427,366     Mozley et al. _____ Sept. 16, 1947